March 3, 1931.  J. A. HEANY  1,794,613
TRANSMISSION SYSTEM
Original Filed Feb. 21, 1922   5 Sheets-Sheet 1
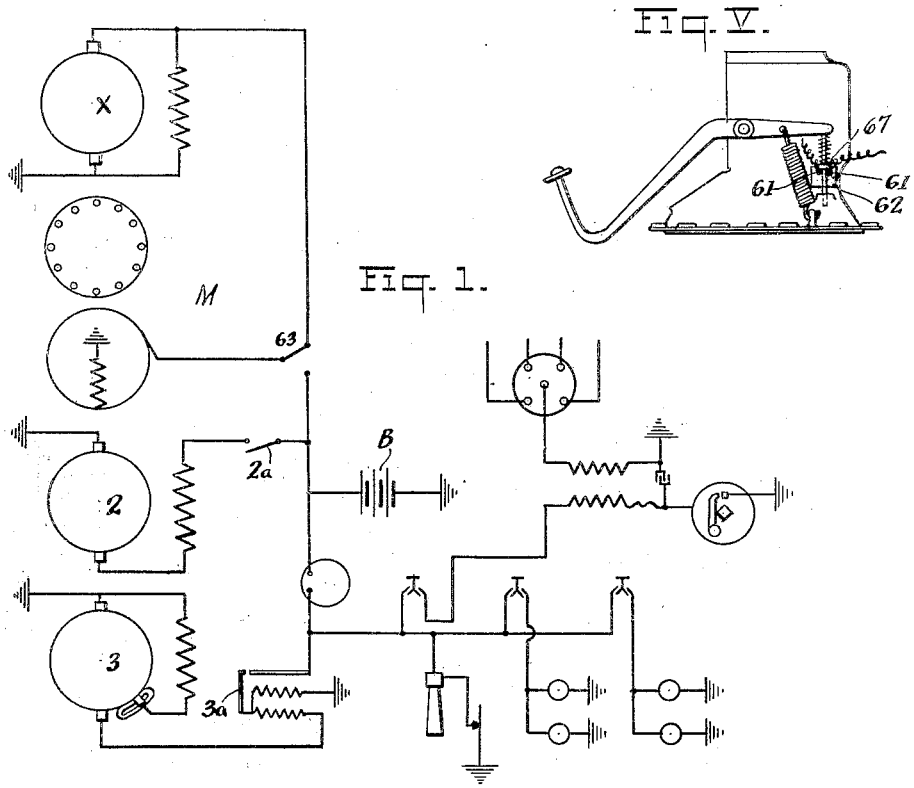
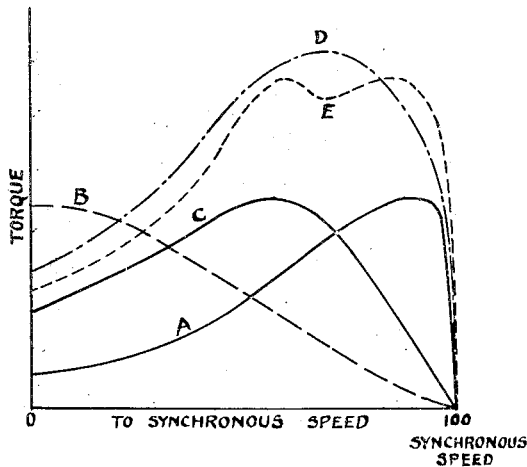
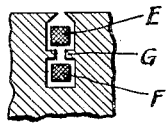
INVENTOR.
John Allen Heany
BY
Chester H Bronelto
ATTORNEY

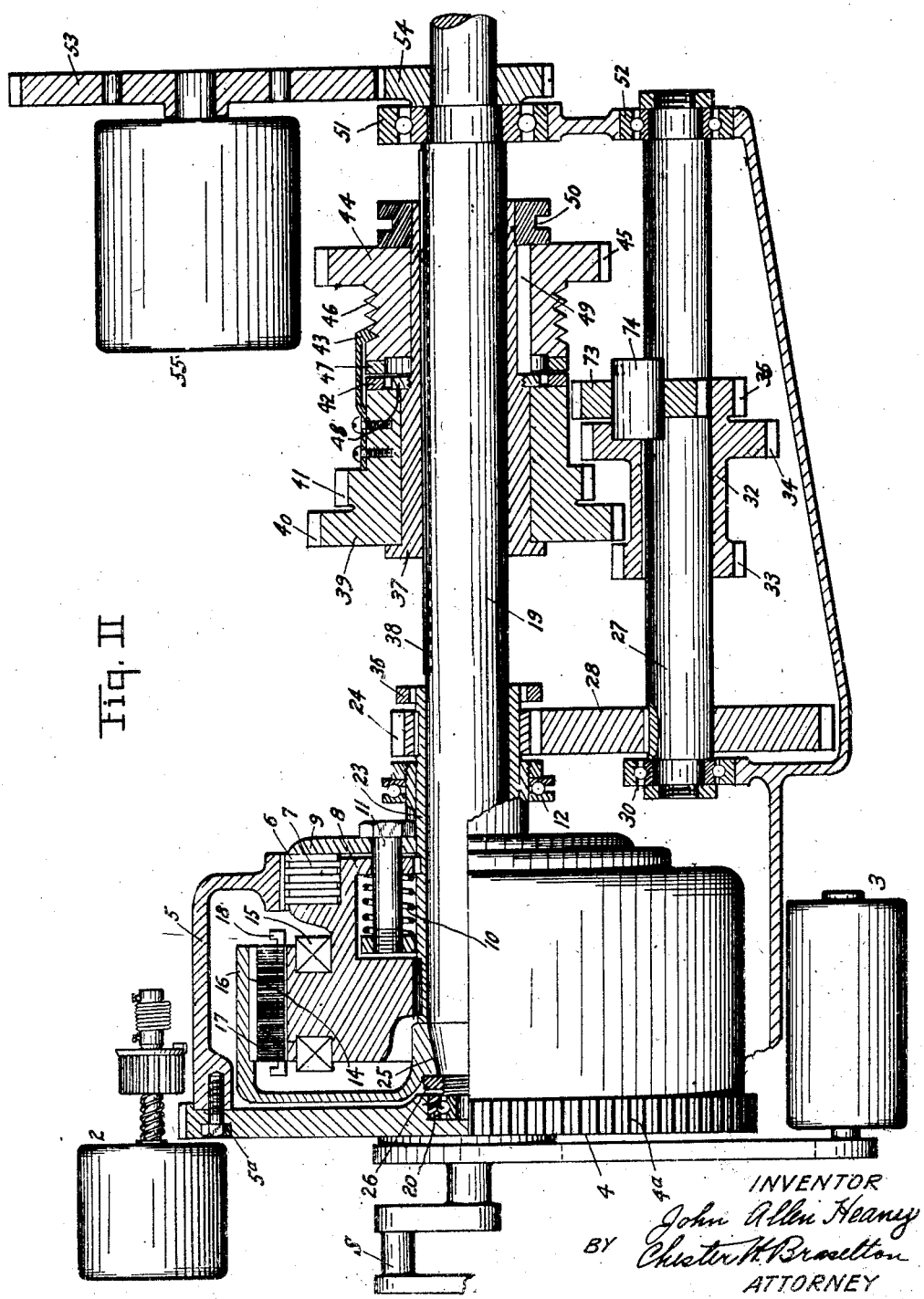

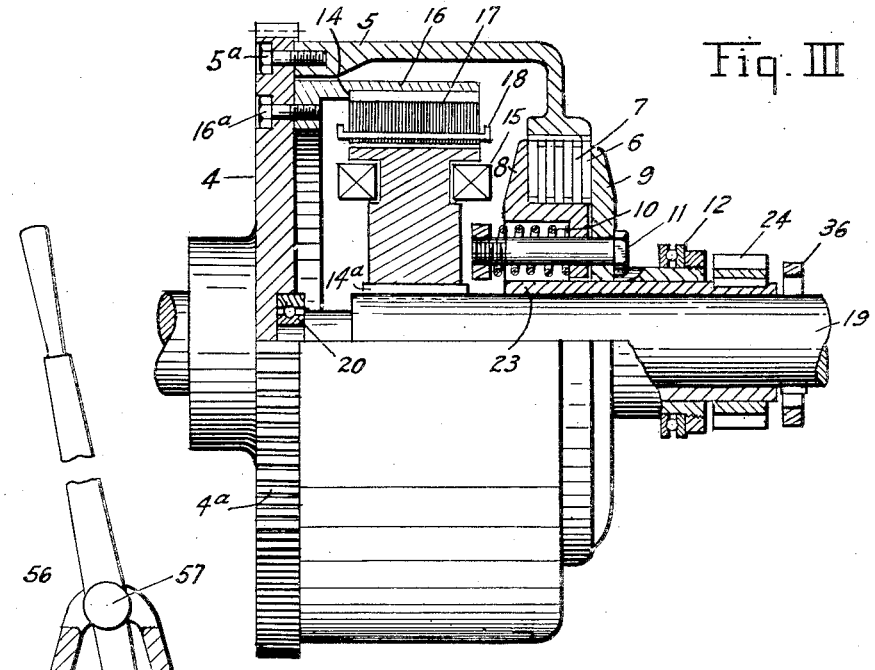
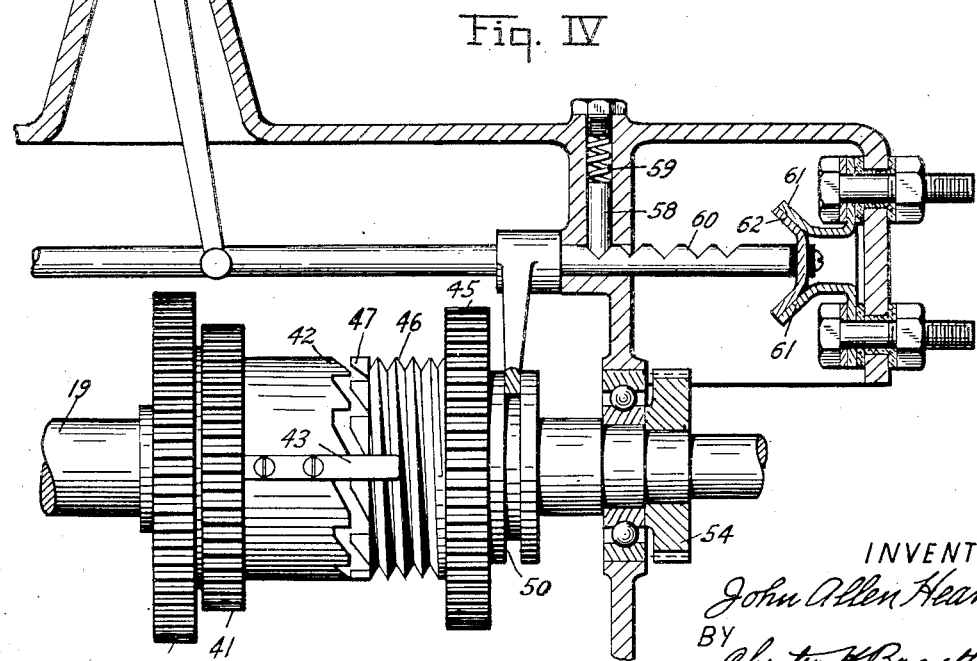

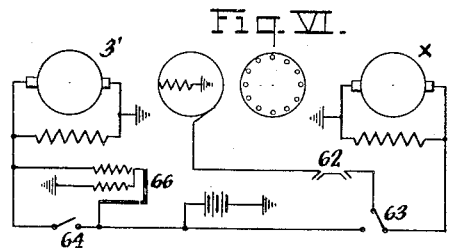
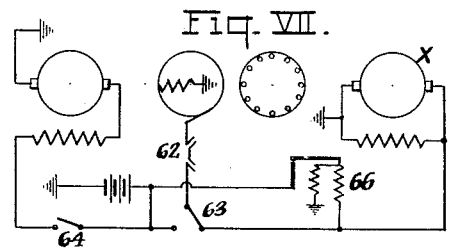
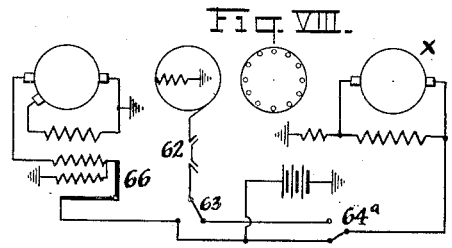
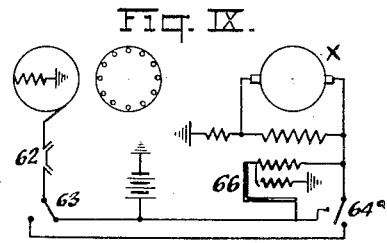
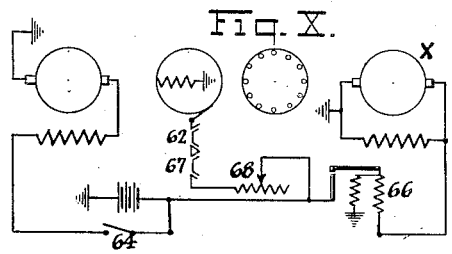
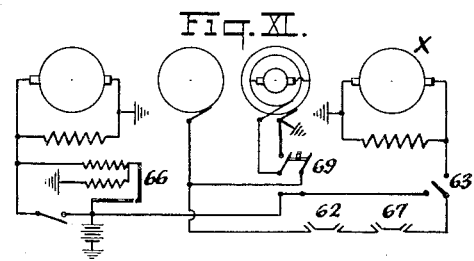
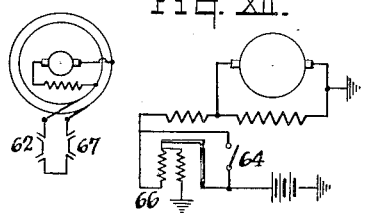
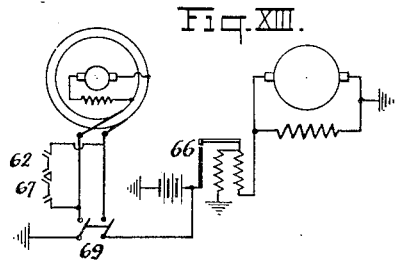
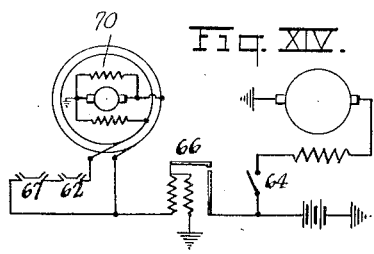
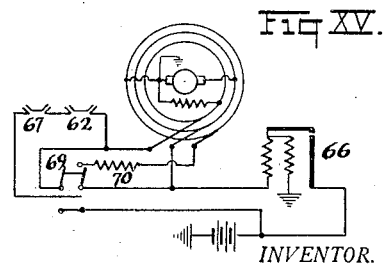
INVENTOR.
John Allen Heany
BY Chester W Bradton
ATTORNEY March 3, 1931.  J. A. HEANY  1,794,613
TRANSMISSION SYSTEM
Original Filed Feb. 21, 1922    5 Sheets-Sheet 5
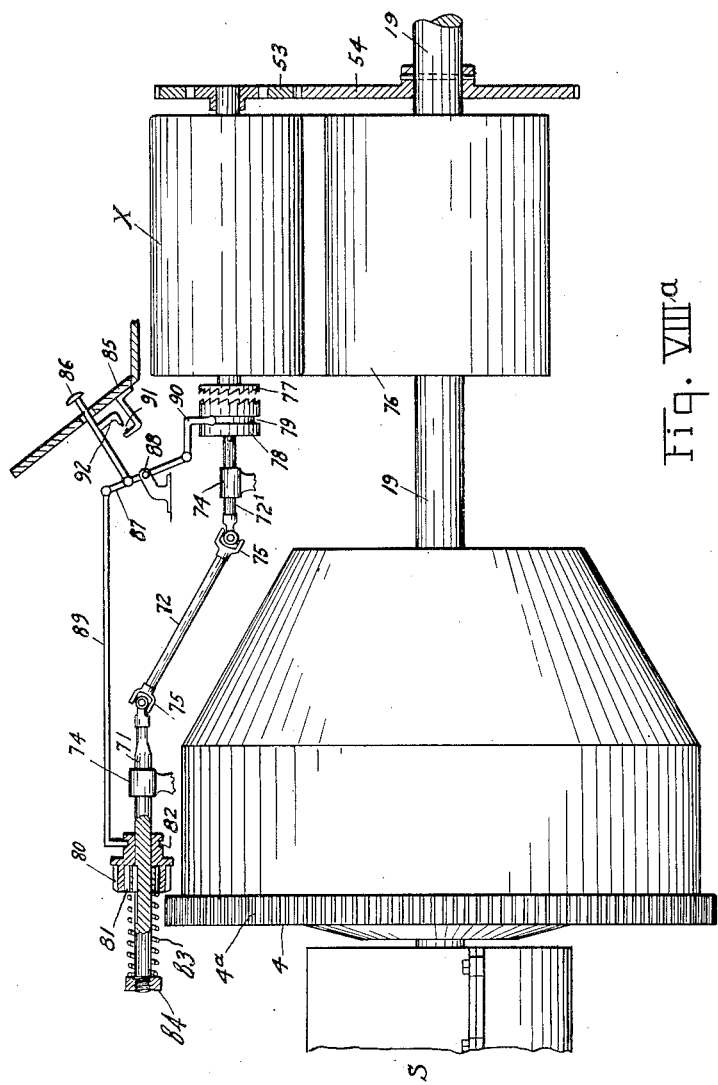
Fig. VIII<sup>a</sup>
Inventor
John Allen Heany
By Attorney
Chester H. Braselton Patented Mar. 3, 1931

1,794,613

UNITED STATES PATENT OFFICE

JOHN ALLEN HEANY, OF NEW HAVEN, CONNECTICUT, ASSIGNOR, BY MESNE ASSIGNMENTS, TO HEANY AUTO TRANSMISSION COMPANY, A CORPORATION OF DELAWARE

TRANSMISSION SYSTEM

Application filed February 21, 1922, Serial No. 538,233. Renewed March 2, 1928.

This invention relates to an improved system of transmission for automobiles or self-propelled vehicles, comprising a combination of electro-magnetic and mechanical clutches so arranged in connection with suitable gears as to give automatic change of speeds depending on the relative speed of driving means and driven member and torque requirements of the car, and also containing simplified means of manually shifting into various forward and reverse speeds.

Figure I is an electrical diagram of one embodiment of the invention.

Figure Ia is an electrical diagram indicating variation of torque with speed.

Figure Ib is a detailed section showing one method of winding the motor secondary.

Figure II is a longitudinal sectional view of one type of magnetic clutch and gear set with the other electrical units shown in elevation and all assembled with engine shaft and fly wheel.

Figure III is a longitudinal view of a modification.

Figure IV is a sectional view illustrating the manual control used with the construction shown in Figure II.

Figure V illustrates the control of the switch.

Figures VI to XV are views similar to Figure I showing modifications.

Figure I shows a schematic wiring diagram of the complete electrical system, wherein the motor 2, generator 3, starting switch 2a, reverse current relay 3a and battery B are the same as used in ordinary practice. An exciter X is arranged to furnish current to the field of the magnetic clutch unit M, all operating as will appear, the magnetic clutch cooperating with mechanical speed changing means dependent upon the relative speeds of engine shaft and rear axle of the car and the torque requirements.

Figure II shows a longitudinal section of the complete system, in which S represents the ordinary engine or prime mover, 2 the starting motor, 3 the charging generator, 4 fly wheel with gear teeth 4a provided for meshing with the pinion on starting motor 2, the arrangement so far being similar to that used in ordinary practice. The supporting member 5 fastened to fly wheel 4 by means of bolts 5a carries one member 6 of a multiple disc type of friction clutch. The driven member 7 of this mechanical clutch is mounted on a rotor 8 which is keyed to sleeve 23 which is free to rotate on main drive shaft 19. Sleeve 23 also carries a driving pinion 24. The rotor 8 also connects with or itself forms the armature of a dynamo electric machine forming the magnetic clutch which is shown here with field member 15. The armature 14 is represented here as made of laminations 17 and carrying a closed squirrel cage or other type of alternating current winding 18 supported in a shell 16 which is permanently or fixedly fastened to shaft 19 by taper fit as shown at 25, held in place by lock nut 26 or by keying or other means. The main shaft 19 is supported by ball bearings 20 in the fly wheel and 51 in the outer case.

Mounted on the main shaft 19 is a sleeve 37 slidingly keyed thereto, on which is mounted part 39 which consists of gears 40 and 41 and jaw clutch 42 so arranged as to turn freely on sleeve 37 but kept from moving along the sleeve by nut 48 as shown in Figures II and III. Sleeve 37 also carries a part 44 slidingly keyed thereto by key 49, which carries a gear 45 and jaw clutch 47, also a coarse pitch thread 46, in which a spring nut carried by part 39 and shown at 43 engages. Longitudinal movement along the shaft is imparted to sleeve 37 by means of grooved collar 50.

Further details of this shift mechanism are shown in Figure IV, in which 56 represents a shifting lever hinged at 57 and cooperating with a pin 58 backed up by spring 59, so arranged that it engages with the notches in quadrant 60, absolutely determining the different positions and shifting by straight line motion. The countershaft 27 is supported in the case by ball bearings 30 and 52 and carries gear 28 which is always in mesh with pinion 24 on sleeve 23. Countershaft 27 also carries part 32 consisting of gears 33, 34 and 35 fixedly keyed thereto. 73 is an idler gear supported on shaft 74 and continuously meshing with gear 35 and used for reverse driving. Gears are so designed that 33 will mesh with 40 for low gear, 34 with 41 for second gear or 73 with 45 for reverse, according to the running position determined by shift lever 56. The neutral positions necessary when changing from one position to another are also made positive by suitable notches as shown.

Driven by the main shaft 19 through pinion 54 and gear 53 is a fourth dynamo electric machine shown at 55 used as a direct current exciter for the field of the electric magnetic clutch unit. A slip ring 36, fastened to sleeve 23 is provided, whereby the field current is conducted from the outside to the revolving field member.

The friction clutch 6—7 is normally held closed by means of clamping ring 9 through bolts 11, springs 10 working in combination between ring 9 and part 8, but there is provided at 12 a bearing whereby the pressure of 9 can be relieved through a foot pedal similar to ordinary methods.

In the field circuit 15 is provided a safety switch consisting of contacts 61 and short circuiting member 62 so arranged that it is closed only when shift lever 56 is in second and high position as shown in Figure IV, whereby the magnetic clutch unit is inoperative for all other positions of the shift lever 56. A three point switch as shown at 63 is also provided in the field circuit. This switch is normally closed so as to connect exciter current to the field but may be so connected as to provide field current from the storage battery system in case of any trouble with the exciter.

The squirrel cage or other type of secondary of the magnetic clutch may be so designed as to give a comparatively long torque peak range. The system of operation is as follows:

The engine is started in the usual manner through starting motor 2. With the friction clutch normally closed, countershaft 27 is driven continuously by the engine through fly wheel 4, support 5, clutch members 6, 7, 8, sleeve 23, pinion 24, gear 28; jaw clutch teeth 42 and 47 are so arranged that part 39 will drive part 44 only in a forward direction. With low gear 33—40 or second gear 34—41 in mesh, part 39 is driven by the countershaft at a speed below that of the flywheel. When the car is standing still, part 44 through key 49, sleeve 37 and key 38 is also stationary. Part 39 revolving causes part 44 to be drawn towards 39 by means of spring nut 43 working in thread 46 so that part 39 drives part 44 through the jaw clutch 42—47 and thence through to main shaft 19, thence to the wheels of the car.

When the car is standing, exciter 55, driven by the main shaft 19, which is also stationary, does not generate but as soon as the shaft 19 beings to revolve, a voltage is produced by exciter 55 and if the shift lever 56 is in second and high position, this voltage is carried to the field coils 15 of the primary member of the magnetic clutch exciting this field member and thereby producing a torque pull between the primary and secondary members of the magnetic clutch. The higher the speed of shaft 19, the greater the generator voltage and therefore the field excitation of the clutch so that at some point of speed the torque pull of the magnetic clutch which is transmitted directly to the main shaft 19 is such an amount that it tends to drive shaft 19 at a higher speed than it is being driven through the reduction of the countershaft, thus causing the jaw clutch 42—47 to push open in which position it is held by the spring nut 43 and the shaft speed continues to pick up until a comparatively low slip of the magnetic clutch is reached. Should an increased torque requirement such as would be occasioned by a hill or other heavy driving occur, the slip of the magnetic clutch will gradually increase, making a higher relative difference in speed between the fly wheel and the main shaft. If this slip increases to the point where the tendency to drive the main shaft is at a speed slightly lower than part 39 is being driven through the countershaft reduction, jaw clutch 42—47 will again quietly mesh in and the main shaft will be driven through the second gear reduction. This change can be made at any predetermined slip as arranged by the second gear ratio and torque speed curve of the clutch. A particular feature of this combination is that there is no change in engine speed during the change from second to high or from high to second as is the case with any type of mechanical gear change. A further point is that the magnetic slip of the clutch unit is a means of smoothing out pulsations of the engine to the rear wheels.

An important feature of the operation is that one member of the magnetic clutch is always revolving at the speed of the main shaft and if the field circuit is closed and the field thereby partially magnetized, as at low speeds, some torque will be transmitted thereby to the main shaft in addition to that transmitted through the mechanical gear reduction and it can therefore pick up the entire load at any such time that its field becomes sufficiently strong to produce the necessary torque.

Another feature of the invention is the simplified shifting device provided, whereby all shifting can be done with a single forward and back motion of a single lever, and the normal running position of this lever will always be forward so as to be out of the way. The straight line motion also does away with the necessity of any tumblers and the definite stops provided minimize the danger of going from one gear position into another which would cause damage as for instance from low to reverse. The method shown for gear shifting is only one of many combinations that may be used for this purpose, as for example any of the systems in present practice or others which may be devised to accomplish the same results. One new system might be to eliminate the shift lever and operate the changes by means of wires or rods from the dash. Another method would be to have a manually operated electrical system for shifting which would also eliminate the shift lever and be operated by buttons on the dash or steering column. Combination of magnetic slip and second gear reduction is such that it will be very seldom necessary to use a low gear.

In order to produce a magnetic clutch having a long torque peak range I employ a squirrel cage type of induction motor with two cage windings of different resistances and locations, illustrated in Figures I$a$, and I$b$. The ordinary squirrel cage induction motor has a speed torque curve with a shape similar to curve A of Figure I$a$ with the peak within a few percent of synchronous speed. By increasing the resistance of the squirrel cage winding sufficiently in proportion to its reactance, the maximum torque point may even be made to occur at zero as curve B. By a different proportion of resistance and reactance this maximum may be made at some intermediate speed as shown by curve C.

A slot construction of the motor secondary similar to that of Figure I$b$ can be used to support two squirrel cage or other type of winding having different resistances, the one nearer the air gap as at E having the greater while that at F approaches the resistance of copper. The winding F by its deep location in the slot has very much higher reactance than E and this is further increased by the magnetic bridge G so that at high slip and frequency, or when the engine is running appreciably faster than the car, F produces very little torque, while E, due to its higher resistance and lower reactance, does produce torque. As the slip and frequency decrease due to the car speed increasing in proportion to the engine speed, the torque gradually shifts from E to F so that at normal running almost the entire torque is produced by F. The torques exerted by E and F will always add so that the net torque speed curve will have a shape similar to D or possibly with a slight dip as in E.

The shape of the torque speed curves will be the same regardless of field strength within reasonable limits but the value will vary almost in direct proportion to the field strength. This, in turn, is dependant on the voltage which is proportional to the car speed because of the exciter being driven by the propeller shaft.

A number of modifications of the electrical equipment are shown in Figures VI to XV and are briefly described as follows:

Figure VI shows a system similar to that of Figure I, except that a single unit 3' is used for a combined starting motor and charging generator. The advantage of this would be that the addition of the exciter X would be compensated for by the elimination of the generator. This system also provides the emergency switch 63 for battery field excitation, safety switch 62 in the field circuit, starting switch 64 and selector or reverse current relay 66 in the generator circuit.

Figure VII shows the system in which the exciter X is used also as a battery charging generator and the ordinary starting motor is kept for starting the engine. Selector 66 is placed in the circuit between the exciter and the battery so as to cut out at such times as the exciter voltage would be too low or too high for battery charging.

Figure VIII shows a system whereby the starting motor is eliminated but the ordinary charging generator is retained. In this case the exciter X is used as a starting motor for the engine by means of some form of extension of its shaft and a selective gear system following the principle of the Bendix drive or some other means whereby when current is supplied to the exciter from an outside source such as the storage battery by means of a switch as shown at 64$a$, the exciter is released from mesh with gears 53 and 54 and its shaft extension would mesh with starting gear 4$a$ on the fly wheel and also so arranged that after the engine is started the connection with the fly wheel is released. This system is similar to that obtained by removing the starting motor from its ordinary position and placing it so as to be driven by the main shaft 19 with the provision for starting as just described so that there would be no auxiliary starting units required as in Figure I. In Figure VIII$a$ I have illustrated a suitable connection.

Exciter X is shown mounted on the side of the transmission gear case 76 or any other suitable location so that it would be driven as a generator by the propeller shaft 19 through gears 53 and 54. Gear 53 is made with an internal ball, roller, or ratchet clutch device operating in only one direction so that when driven by 54, it will drive the shaft of the exciter but when this unit is operating as a motor, gear 53 will be free from the shaft. The connection between 55 and gear 4$a$ on the fly wheel is made by means of shafts 71, 72, 72' supported by suitable bearings as 74 and joined by universals as 75. 77 is one member of a dog or other type of clutch fastened to the exciter shaft. The other member 78 of the clutch is slidingly keyed to shaft 72' and has groove 79 provided for shifting along the shaft. Pinion 80 is mounted on shaft 71 and has a clutch construction similar to that already described in gear 53 and arranged to drive when meshed with 4a for starting and to run free when driven by 4a and before being released from mesh. The internal member 81 of pinion 80 is slidingly keyed to 73 and is provided with groove 82 for longitudinal motion. Spring 83 is provided, held by nut 84 to assist in releasing 80 from mesh with 4a.

85 represents the floor board and 86 a pedal similar to that ordinarily used for starting. 86 is attached to lever 87, hinged at 88 to the ends of which are fastened arms 89 and 90 having fingers for engagement in grooves 82 and 79. 86 also carries a closing member 92 for switch contacts 91 so adjusted that it will close only after the gears are in mesh.

Figure IX shows the system with both the starting motor and lighting generator eliminated and a single unit constituting a combined generator and motor arranged to be driven by the main shaft 19 with selective provision for meshing with the fly wheel gear for starting purposes, a selector relay 66 for cutting out the battery and a starting switch 64a which is normally closed in the field circuit but used to close in the battery circuit to the exciter for starting purposes.

Figure X shows a system with a variable resistance 68 inserted in the field circuit and preferably arranged to be controlled in conjunction with the accelerator, on the principle that when the greatest torque is required, it is supplied by increase in the gas to the engine and the electric torque can also be increased by cutting out resistance and thus increasing field strength. At other times when the torque requirement is not so large, the field current can be reduced coincidently with the reduction of gas and the load on the generator thereby also reduced. An additional safety switch 67 is also provided preferably to be operated in conjunction with the clutch lever which releases the friction clutch shown in Figure II. This safety switch is in addition to switch 62 operated by the shift lever.

As explained in connection with Figure X, safety switch 67 should preferably be operated in conjunction with the clutch lever or pedal which is used to control the friction clutch driving the second or mechanical gear reduction. In this diagram, the excitation is taken from the battery and the field circuit would remain closed and the electric clutch continue to take excitation current if constructed as in Figure II, even if the friction clutch pedal were operated and the shift lever left in 2nd-high position. The addition of switch 67, opened when the clutch pedal is depressed, insures the opening of the field circuit at any time it is desired to release the engine from the propeller shaft as is done in ordinary cars by releasing the clutch. Of course after the shift lever is in neutral the field circuit is broken by switch 62 at the same time the mechanical connection is opened. While switch 67 is not shown on Figures I, IV, VI, it would be equally applicable in these diagrams as emergency battery excitation is provided in the three point switch 63.

Figure XI shows a modification having a direct current clutch secondary instead of a squirrel cage or other alternating current secondary. In this case the clutch is used as a starting motor for the engine by suitable switch provision as shown at 69 and the exciter as described in the previous cases is retained for separate excitation of the clutch unit; also safety switches 62 and 67 as previously described. Means are provided in this system for short circuiting either across the D. C. brushes or completely short circuiting the commutator after the engine is started so that the unit operates as a self contained closed secondary separately excited motor for the production of torque to the shaft.

Figure XII shows another direct current modification whereby the clutch unit is a closed circuit or series type of generator without any external source of supply and also in which the starting motor and generator is combined in one unit. In this case the clutch unit becomes a self excited generator in which the field acts as a load source for the armature current for the production of torque. Safety switches 62 and 67 are retained in this system.

Figure XIII shows a modification in which the clutch unit is used as a self-excited generator and is also arranged by suitable switching to act as a starting motor with current taken from the battery and the battery is charged by the ordinary type of generator.

Figure XIV shows the system whereby the ordinary starting motor is retained but the ordinary generator is replaced by wiring provision whereby charging current is taken from the commutator of the clutch unit. For this system it is also necessary to provide a load resistance as shown at 70 which is always connected across the brushes so as to provide a load for the armature current at such times when the selector 66 would be open circuited.

Figure XV shows a system in which all of the auxiliary motor and generating units as previously described are concentrated in the clutch unit with switching provision for use as a starting motor, a load resistance 70 closed in for running and a selector 66 provided for control of the charging current.

Figure III shows a modification in the mechanical arrangement of the clutch members. In this case the driving member of the magnetic clutch is connected directly to the fly wheel 4 by bolts 16a and the driven member of the clutch is fastened directly to the main shaft by key 14a so that the friction clutch only drives the countershaft through pinion 24 etc., as previously described. This arrangement has the advantage that it is not necessary to transmit the power input to the magnetic clutch through the friction clutch, thus increasing the efficiency and also that the driving member of the magnetic clutch being fastened to the fly wheel increases the fly wheel action by adding weight to this part of the assembly. Another change is in mounting the slip ring 36 directly on the main shaft instead of on the sleeve 23 as a means of conducting the current to the field. It is not necessary to place primary and secondary or field and armature in the relative positions as shown here, as either the primary or secondary member may be connected to the fly wheel and the other to the shaft.

The direct current units (motors, generators or exciters) may be shunt machines, but some other form as series, compound, differential, third brush, or auxiliary shunt field from battery would be required in use, the generator for charging the storage battery having regulation to prevent charging at excessive rates as the same is used with a variable speed internal combustion engine. A series motor for starting would develop a maximum starting torque.

What I claim is:

1. In a transmission mechanism, a prime mover, a shaft to be driven therefrom at variable speeds, an automatic mechanical change speed gear mechanism between said prime mover and shaft, a magnetic clutch having a driving element connected to said prime mover and a driven member adapted to drive said shaft, said driven member being associated with said change speed gear mechanism and means driven from said shaft for exciting one of said magnetic clutch elements operative to develop torque in said clutch proportional to the speed of said shaft and means to effect an automatic engagement and disengagement of said gear mechanism.

2. In a transmission mechanism, a prime mover, a shaft to be driven therefrom at variable speeds, an automatic mechanical change speed gear mechanism between said prime mover and shaft, including a magnetic clutch and means driven from said shaft for exciting one of said magnetic clutch elements operative to develop torque in said clutch proportional to the speed of said shaft and effect an automatic engagement and disengagement of said gear mechanism.

3. In a transmission mechanism, the combination of a prime mover; a shaft to be operated thereby; a mechanical change speed gear set interposed between the prime mover and the shaft; a magnetic clutch also interposed between the prime mover and the shaft, said clutch and gear set being adapted to transfer power independently of each other between prime mover and shaft, a generator driven by said shaft, the torque of said clutch being determined by the relative speeds of the prime mover and the shaft, and the excitation of said clutch being provided by said generator and being dependent upon the speed of the shaft.

4. In a transmission, a combined automatically operating mechanical change speed gear set between a prime mover and a shaft to be operated thereby and a magnetic clutch between said prime mover and shaft, the torque of which is determined by the relative speeds of the prime mover and shaft, and means to effect an engagement and disengagement of said change speed set by the torque of said magnetic clutch.

5. In combination in a motor vehicle, a prime mover; a driven shaft; mechanical power transmission including suitable reduction gears between said prime mover and said shaft; means to generate electrical energy from said prime mover; a storage battery charged from said generating means; a magnetic clutch connected between said prime mover and said shaft; separate generating and exciting means for said magnetic clutch driven from said shaft, said clutch adapted to be selectively supplied with excitation either from said battery or said exciting means; and automatic means for shifting the driven force applied to the driven shaft between the said mechanical power transmission means and magnetic clutch, dependent on the relative speeds of the prime mover and driven shaft.

6. A transmission system for automobiles or other variable speed devices comprising a prime mover and a driven shaft; an induction machine used as an electro-magnetic clutch for power transmission from said prime mover to said driven shaft; a friction clutch for power transmission from said prime mover to said driven shaft through suitable reduction gears; means for excitation of the electro-magnetic clutch unit, means associated therewith for automatically effecting a change from power transmission through said friction clutch to a direct driving through said electro-magnetic clutch, determined by relative speeds of the prime mover and said driven shaft, and means for interposing emergency low gears and reverse between the friction clutch and driven shaft independent of the electro-magnetic clutch.

7. In a transmission system, the combination of a magnetic clutch between drive and driven shafts, and exciting means therefor including a generator mechanically connected to the driven shaft, the torque of the clutch being zero when the driven shaft is not rotating, and varying with the exciter voltage as determined by the driven shaft speed and mechanical transmission beween said drive and driven shafts, said power transmission mechanism being adapted to operate independently of the clutch.

8. A transmission system for automobiles and other variable speed devices comprising a prime mover and a driven shaft; a friction clutch unit having one member mechanically connected to said prime mover, the other member mechanically connected to a gear reduction set for said shaft; means for manually releasing said friction clutch; means for connecting the prime mover and shaft through said reduction gear; an induction machine used as an electro-magnetic clutch unit having one member mechanically connected to the prime mover, the other member fixedly connected to the driven shaft; an exciter mechanically connected to the driven shaft for providing excitation energy for the electro-magnetic clutch, the torque of the electro-magnetic clutch unit being zero until said driven shaft is started and thereafter varying approximately directly with the exciter voltage as determined by speed of the driven shaft; a storage battery; means driven by the prime mover for charging said storage battery; said exciter being susceptible of use as a starting motor for the prime mover with power taken from said storage battery; automatic means for mechanically engaging and disengaging the gear reduction set connection between the friction clutch and the driven shaft according to the relative speeds of driving shaft and driven shaft and torque requirements of the driven shaft; and mechanical means for opening the excitation circuit of the electro-magnetic clutch and engaging the friction clutch to the driven shaft through an emergency low gear or reverse gear when required.

9. In a transmission system, a drive shaft; a driven shaft a magnetic clutch between said shafts; a generator mechanically connected to the driven shaft adapted to furnish the excitation for said clutch; a mechanical change speed gear connected between said drive and driven shafts, said change speed gear being in parallel with said clutch and adapted to transmit power independently of said clutch.

10. In a transmission system as described, the combination of a prime mover; a driven shaft; a magnetic clutch; a generator mechanically connected to the driven shaft adapted to furnish the excitation for the clutch; and means for connecting said prime mover and driven shaft independently of said clutch, the clutch having a torque speed range for effective power transmission dependent upon the speed of the driven shaft.

11. In a transmission system, the combination of a prime mover, a shaft to be operated thereby, a mechanical change speed gear between the prime mover and shaft, a magnetic clutch between the prime mover and shaft, the excitation of said clutch being dependent upon the speed of the shaft and means to effect an engagement and disengagement of the change speed gear connection by means of the torque of the magnetic clutch.

12. In a power transmission system, a prime mover; a driven shaft; mechanical means for transmitting power from the prime mover to the driven shaft at a speed less than that of the prime mover; an electromagnetic clutch for transmitting power from the prime mover to the driven shaft at substantially the same speed as the prime mover; a generator mechanically connected to the driven shaft for supplying excitation to the electro-magnetic clutch; the excitation and resulting torque being approximately proportional to the speed of the driven shaft; a generator driven by the prime mover; a storage battery supplied with charging current by said generator; switching means whereby excitation for the electro-magnetic clutch may be taken from the storage battery instead of the exciter; and means automatically operative to release or engage the reduced speed mechanical connection to the driven shaft as determined by the torque requirement of the driven shaft and the relative torque supplied thereto by the electro-magnetic clutch.

13. In a transmission system, a drive shaft; a driven shaft; a magnetic clutch between said shafts; a generator mechanically connected to the driven shaft adapted to furnish the excitation for said clutch proportional to the speed of said driven shaft; a mechanical change speed gear connected between said drive and driven shafts, said change speed gear being in parallel with said clutch and adapted to transmit power independently of said clutch.

14. In a transmission mechanism, a driving shaft, a driven shaft, means requiring relative slip between elements fixedly connected to said shafts for transmitting power therebetween, means independent of said first means for positively transmitting additional power between said shafts at fixed reduced speed ratio, and means for automatically connecting and disconnecting said second mentioned means between said shafts without affecting transference of power of said first mentioned means.

15. In a transmission mechanism, a variable speed driving shaft, a variable speed driven shaft, means permanently connected thereto and requiring relative slip between said shafts for transmitting power therebetween regardless of the actual speeds of said shafts, additional means releasably connected therebetween for positively transmitting power at fixed speed ratio between said shafts, and means for automatically disconnecting and connecting said second means out of and into parallel driving relation with said first means.

In testimony whereof, I affix my signature.

JOHN ALLEN HEANY.